(12) United States Patent
LeBlanc

(10) Patent No.: US 12,487,068 B1
(45) Date of Patent: Dec. 2, 2025

(54) APPARATUS FOR DOCUMENTING STAIR DIMENSIONAL UNIFORMITY

(71) Applicant: Christopher Neil LeBlanc, Lafayette, LA (US)

(72) Inventor: Christopher Neil LeBlanc, Lafayette, LA (US)

( * ) Notice: Subject to any disclaimer, the term of this patent is extended or adjusted under 35 U.S.C. 154(b) by 356 days.

(21) Appl. No.: 18/142,601

(22) Filed: May 3, 2023

Related U.S. Application Data

(60) Provisional application No. 63/364,212, filed on May 5, 2022.

(51) Int. Cl.
*G01B 3/30* (2006.01)
*G01B 3/56* (2006.01)

(52) U.S. Cl.
CPC ............. *G01B 3/303* (2013.01); *G01B 3/566* (2013.01)

(58) Field of Classification Search
CPC ................................ G01B 3/303; G01B 3/566
See application file for complete search history.

(56) References Cited

U.S. PATENT DOCUMENTS

| | | | | |
|---|---|---|---|---|
| 124,887 A * | 3/1872 | Dalgliesh | ............... | G01B 5/043 33/747 |
| 503,050 A * | 8/1893 | Lantz | .................... | B43L 7/0275 33/474 |
| 1,489,572 A | 4/1924 | Bennewitz | | |
| 3,623,232 A * | 11/1971 | Mahlstadt | ........... | E04G 21/1891 33/423 |
| 3,813,785 A | 6/1974 | Larsen | | |
| 5,388,340 A * | 2/1995 | Marty | ..................... | E04F 21/26 33/421 |
| 6,070,334 A * | 6/2000 | Pretsch, Jr. | .............. | B25H 7/00 269/93 |
| D546,213 S | 7/2007 | Daley | | |
| 7,350,306 B2 * | 4/2008 | Reed | ......................... | B43L 7/02 33/420 |
| 10,907,947 B2 * | 2/2021 | Vuylsteke | ................ | G01B 3/04 |
| 11,668,552 B1 * | 6/2023 | Braddock | ................ | B25H 7/02 33/429 |
| 2007/0113416 A1 * | 5/2007 | Reed | ........................ | E04F 21/26 33/474 |
| 2015/0233131 A1 | 8/2015 | Hofstetter | | |

\* cited by examiner

*Primary Examiner* — Yaritza Guadalupe-Mccall

(57) ABSTRACT

An apparatus for documenting stair dimensional uniformity which measures variations in riser heights and tread depths in a constructed stair. Improved rule stops are attachable to a carpenter's square at positions corresponding to required step dimensions. In operation, the apparatus is self-standing while being supported by and spanning between the upper and lower nosing of a step. A tread variance indicator and riser variance indicator display the amount of variance from required dimensions. A stable nosing locator identifies the portion of a rounded or beveled nosing that may be included in a tread depth measurement. The variance indicators and stable nosing locator are positioned to facilitate photographic documentation.

20 Claims, 6 Drawing Sheets

APPARATUS FOR DOCUMENTING STAIR DIMENSIONAL UNIFORMITY

TECHNICAL FIELD

Embodiments of the present invention generally relate to building code requirements for dimensional uniformity of stairs, and more particularly to an apparatus for documenting variations in riser heights and tread depths in a constructed stair.

BACKGROUND

Stair falls are a leading cause of injuries. Studies have shown a link between falls on stairs and excessive variations in the dimensions of steps in a flight of stairs. Over the past 100 years Building Codes, Fire Codes, Life Safety Codes, and Property Maintenance Codes in the United States [Building Codes] have established and refined requirements for dimensional uniformity of steps in a flight of stairs toward the goal of preventing falls. The existing code requirements for stairstep dimensional uniformity were established over 40 years ago.

Building Codes are adopted and enforced by state and local jurisdictions to establish the minimum level of safety that must be provided in buildings. Architects, engineers, contractors, and property owners are required to ensure that buildings comply with adopted Building Codes. Over the lifetime of a stair, a wide range of parties with varying backgrounds and education are each obligated to ensure stairs are designed, built, and maintained in compliance with Building Code requirements. It is in the interest of each of these parties to document compliance in a clear and trustworthy manner.

Building Codes regulate step dimensions by establishing acceptable sizes of risers, treads, and nosings. In a step, the vertical plane is the riser, the approximately horizontal plane is the tread, and the foremost projecting edge of a tread is the nosing. In part due to the variety and complexity of step shapes, Buildings Codes define which portions of risers, treads, and nosings must be measured to and from when evaluating for dimensional requirements. Riser height is defined as the vertical distance between the nosings of adjacent treads. Tread depth is more complex. Tread depth is defined as the horizontal distance between the foremost projection of adjacent treads. Tread depth excludes any portion of a tread surface that occurs under a nosing that projects in part because those areas are not usable when descending a stair. Tread depth also excludes portions of rounded or beveled nosings that exceed a maximum angle from horizontal because these areas do not provide stable support.

Building Codes regulate dimensional uniformity by establishing the maximum variation allowed between adjacent steps and throughout a flight of stairs. Variations more than 3/16 in. (4.8 mm) between adjacent tread depths or between adjacent riser heights are prohibited. Variations more than 3/8 in. (9.5 mm) between the largest and smallest riser heights or between the largest and smallest tread depths in any flight of stairs are also prohibited. To show compliance with these requirements, each step of a flight of stairs must be precisely measured in multiple locations along its length and compared to the measurements of every other step. For a typical flight of stairs with 12 to 13 steps, approximately 40 areas must be measured, reliably recorded, and compared to effectively prove compliance at the time inspected.

A significant challenge to verifying compliance with the above dimensional uniformity requirements is the complex shape of a typical step. For example, treads are permitted to slope, and treads on exterior stairs are encouraged to slope for drainage. When measuring the riser height of steps with sloping treads, failing to measure from nosing to nosing can lead to errors greater than 1/4 in. (6.4 mm) for compliant stairs and more for non-compliant stairs. A common mistake is to measure the vertical distance between an upper nosing and the tread surface below which leads to this type of error. Nosings are permitted to project past the riser surface and to vary in projection by up to 3/8 in. (9.5 mm). Failure to measure from nosing to nosing for steps with projecting and varied nosings can lead to significant errors. Nosings are also permitted to be rounded or beveled up to 1/2 in. (12.7 mm) in the horizontal direction. Failure to determine the correct point along the nosing profile for measuring tread depths can lead to additional errors. A common mistake when measuring tread depth is to include the entire portion of rounded or beveled nosings.

While Building Code requirements for stair dimensions have been established for approximately 100 years and the current requirements for dimensional uniformity have been in effect for over 40 years, there does not yet exist an intuitive, efficient, and affordable apparatus for accurate and trustworthy documentation of dimensional uniformity in a constructed stair.

SUMMARY

One embodiment of an apparatus for documenting stair dimensional uniformity comprises improved rule stops attachable to a carpenter's square. These improved rule stops comprise a pivot spacer that enables the apparatus to be pivoted into a position determined by a riser height, a pivot hanger that enables supporting one end of the apparatus on an upper nosing, an indicator that displays riser height variances, an indicator that displays tread depth variances, and a nosing locator that identifies portions of rounded or beveled nosings which must be excluded from the tread depth.

Accordingly several advantages of one or more aspects is as follows: an apparatus for evaluating stair step dimensions comprising improved rule stops attachable to a carpenter's square that facilitate documenting variations in riser heights and tread depths, that provides variance indicators to display variations directly, that removes the need to level or adjust between measurements, that simplifies the display of variances to minimize error in documentation, that facilitates clear photo documentation, that attaches to an affordable and commonly used tool widely available at local hardware stores, that is self-contained and does not require separate tools to perform measurements, that is self-standing when measurements are being taken allowing a single operator to perform subsequent measurements or photography, that is compact when collapsed for easy transport, that can expand to evaluate tread depths and riser heights greater than the length of the square members, and that can be fabricated and shipped affordably. Other advantages of one or more aspects will be apparent from consideration of the drawings and ensuing descriptions.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES.

DRAWING REFERENCE NUMERALS

10 Upper Nosing
12 Riser
14 Tread
16 Lower Nosing
18 Vertical Rule Stop
20 Shorter Square Member
22 Longer Square Member
24 Horizontal Rule Stop
26 Means of Fixing Position
28 Riser Variance Indicator
30 Horizontal Extension
32 Pivot Spacer
34 Indicia
36 Tread Variance Indicator
38 Horizontal Slot
40 Pivot Hanger
42 Stable Nosing Locator
44 Vertical Slot
46 Means of Determining Slope
48 Means of Mounting

DETAILED DESCRIPTION

FIG. 1A-1E

Figure 1A:
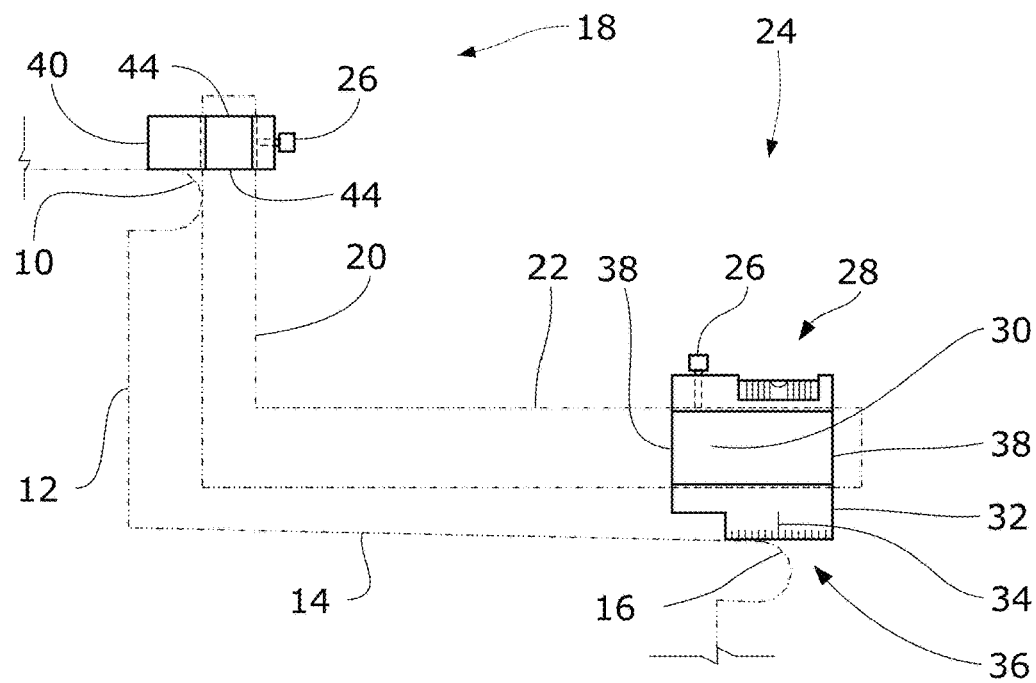
FIG. 1A is a left side view according to one embodiment shown attached to an 8 in.×12 in. (203.2 mm×304.8 mm) carpenter's square measuring a step with projecting rounded nosings and sloping treads with a riser height of 7¾ in. (196.9 mm) and tread depth of 11 in. (279.4 mm)
Figure 1B:
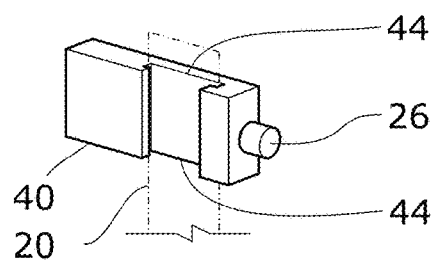
FIGS. 1B and 1C are partial left perspective and partial right perspective views of a vertical rule stop according to one embodiment.
Figure 1C:
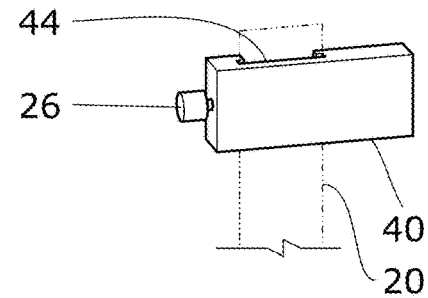
Figure 1D:
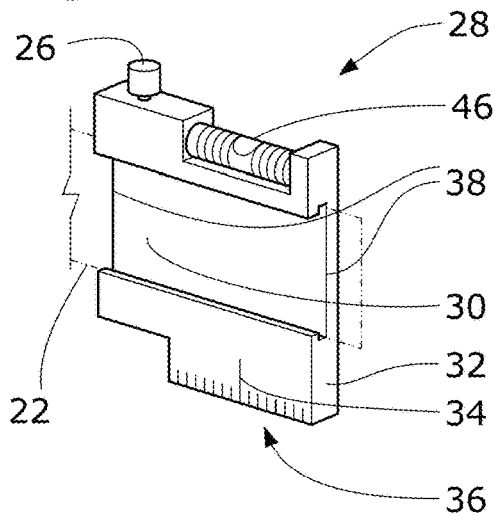
FIGS. 1E and 1D are partial left perspective and partial right perspective views of a horizontal rule stop according to one embodiment.
Figure 1E:
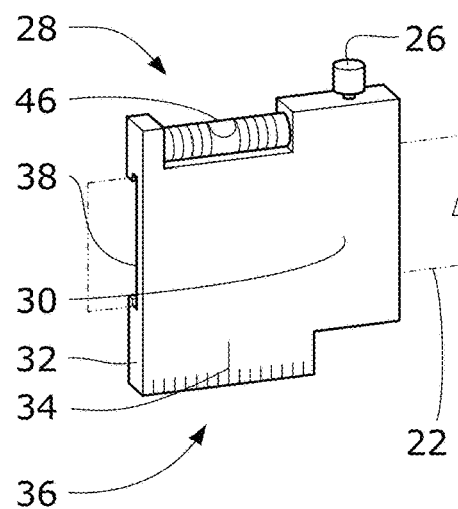

One embodiment of the present invention is illustrated in FIG. 1A (left side view), FIG. 1B (partial left perspective view), FIG. 1C (partial right perspective view), FIG. 1D (partial left perspective view), and FIG. 1E (partial right perspective view).

This embodiment comprises an improved horizontal rule stop 24 and an improved vertical rule stop 18. The horizontal rule stop 24 comprises a horizontal slot 38 sufficiently sized for a secure connection to a longer square member 22 of an 8 in.×12 in. (203.2 mm×304.8 mm) carpenter's square which is approximately 1½ in. (38.1 mm)×⅛ in. (3.2 mm). The horizontal rule stop 24 further comprises a means of fixing position 26, a riser variance indicator 28, a pivot spacer 32, a horizontal extension 30, and tread variance indicators 36 comprising indicia 34. The tread variance indicators 36 are on both the front and back of the horizontal rule stop 24 approximately adjacent to its bottom surface.

The overall length of the horizontal rule stop 24 in this embodiment is 3 in., the height is approximately 3 in., and the depth is approximately ½ in. (12.7 mm). The length can be approximately between 1 in. (25.4 mm) to 8 in. (203.2 mm). The height can be approximately between 3 in. (76.2 mm) to 6 in. (152 mm). The stop can be any thickness that provides sufficient structural strength to hold and stabilize the square when positioned on a stair.

The height of the pivot spacer 32 in this embodiment is 1 in. (25.4 mm) measured in a substantially perpendicular direction from the outside edge of the longer square member 22. The pivot spacer 32 can extend any predetermined height between ½ in. (12.7 mm) and 3 in. (76.2 mm) and it is preferred to be a non-fractional number. It is most preferred for the height to be 1 in. (25.4 mm), 2 in. (50.8 mm), or 3 in. (76.2 mm). The height of the pivot spacer 32 allows a square to measure a riser height exceeding the length of the shorter square member 20. The 1 in. (25.4 mm) height pivot spacer 32 allows an 8 in.×12 in. (203.2 mm×304.8 mm) carpenter's square to evaluate a riser height up to approximately 8.5 in. (216 mm).

The length of the indicia 34 in this embodiment is approximately 2 in. (50.8 mm) and includes graduations spaced ⅛ in. (3.2 mm) apart. The length of the indicia 34 can be between 1 in. (25.4 mm) to 3 in. (76.2 mm) and the graduation may be spaced closer together or further apart.

The 1 in. (25.4 mm) height of the pivot spacer 32 in this embodiment supports the longer square member 22 approximately 1 in. (25.4 mm) above the lower nosing 16 and tread surface 14 allowing the apparatus to be pivoted into a position determined by the riser height. The 1 in. (25.4 mm) pivot spacer height also enables measuring riser heights greater than the length of the shorter square member 20.

The length of the horizontal extension 30 in this embodiment is 2 in. (50.8 mm). The horizontal extension 30 can be any predetermined length between 2 in. (50.8 mm) and 8 in. (203 mm). The horizontal extension 30 enables measuring tread depths that exceed the length of the longer square member 22. The 2 in. (50.8 mm) length horizontal extension 30 of this embodiment allows an 8 in.×12 in. (203.2 mm×304.8 mm) carpenter's square to evaluate tread depths up to approximately 13 in. (330 mm).

In this embodiment, the riser variance indicator 28 comprises a graduated spirit level that provides sufficient sensitivity and graduations for determining the slope of the longer square member 22 within a range of approximately plus or minus 1 in. (25.4 mm) vertical rise or fall for each 12 in. (304.8 mm) of horizontal run. The riser variance indicator 28 can alternatively or further comprise other means for determining slope including, but not limited to, a spirit level, inclinometer, digital level, or other type of digital sensor.

The vertical rule stop 18 comprises a vertical slot 44 sufficiently sized for a secure connection to a shorter square member 20 of an 8 in.×12 in. (203.2 mm×304.8 mm) carpenter's square which is approximately 1 in. (25.4 mm)× ⅛ in. (3.2 mm). The vertical rule stop 18 further comprises a means of fixing position 26, and a pivot hanger 40.

The overall length of the vertical rule stop 18 in this embodiment is approximately 3 in. (76.2 mm). The overall height is approximately 1 in. (25.4 mm) and the depth is approximately ½ in. (12.7 mm). The length can be approximately between 3 in. (76.2 mm) to 5 in. (127 mm). The height can be any predetermined height of ½ in. (12.7 mm) to 4 in. (102 mm) and is preferred to match the height of the pivot spacer 32. The depth can be any thickness that provides enough structural strength to hold and stabilize the square when positioned on the stair.

The pivot hanger 40 extends in a substantially perpendicular direction approximately 1 in. (25.4 mm) from the outside edge of the shorter square member 20. The pivot hanger 40 can extend up to 2 in. in some embodiments.

The horizontal rule stop 24 and vertical rule stop 18 are preferably constructed of a sturdy rigid material such as but not limited to plastic, wood, or metal. The rule stops can also be constructed of less permanent materials such as but not limited to cardboard, foamboard, or corrugated board.

In operating this embodiment, one first fixes the position of the horizontal rule stop 24 at a location along the length of the longer square member 22 where the center point of the tread variance indicator 36 is positioned approximately at the required tread depth. In the case of tread depths greater than the length of the longer square member 22, the center point of the tread variance indicator 36 can be positioned beyond the end of the longer square member 22.

Then one fixes the position of the vertical rule stop 18 along the length of the shorter square member 20 relative to the required riser height. Since the pivot spacer 32 in this embodiment raises the lower square member up 1 in. (25.4 mm) the bottom surface of the pivot hangar 40 is positioned where the shorter square member indicates 1 in. (25.4 mm) less than the required riser height.

Next, one places the vertical rule stop 18 on an upper nosing 10 and the horizontal rule stop 24 on a lower nosing 16 of a step while orienting the square so that the outer edge of the shorter square member 20 is against the leading edge of the upper nosing 10 in an approximately vertical position and the longer square member 22 is approximately perpendicular to the lower nosing 16.

At this point the apparatus is self-standing, supported by the vertical rule stop 18 resting upon the upper nosing 10, and horizontal rule stop 24 resting upon the lower nosing 16. The apparatus is self-righting when used with an 8 in.×12 in. (203.2 mm×304.8 mm) carpenter's square on typical-sized stairs. For risers between 6 in. and 9 in. and treads between 10 in. and 16 in. most of the weight of the square is kept below the points where the two stops rest on the upper and lower nosing 16. This distribution of weight causes the apparatus to automatically right itself into a plumb position. The ability to make the apparatus self-righting was a surprising discovery that led to further experimentation with compact squares despite their insufficient length to measure a significant percentage of riser heights and tread depths. Self-righting is desirable for speed and to enable a single operator to have both hands free for subsequent tasks such as photo documentation. Through the addition of a pivot spacer and horizontal extension a compact portable square can measure the majority of riser and tread heights and provide a device that is self-standing and self-righting.

The apparatus is now ready to be read and variances documented. The required riser height is met when the riser variance indicator 28 indicates zero slope. Any variance from a reading of zero slope is directly displayed and can be easily seen and recorded. The required tread depth is met when the leading edge of the lower nosing 16 aligns with the center point of the tread variance indicator 36. Any variance between this center point and the actual position of the leading edge of the lower nosing 16 can be easily seen and recorded.

Once variances are recorded, the apparatus may be moved to a new location on the stair. No additional adjustments or leveling is required for subsequent measurements. By removing the need to manually adjust or level for each area to be measured, both speed and precision are increased.

As the present embodiment is self-standing and self-righting once in place, a single operator has both hands free to record variances manually and preferably via photography. Efficient photographic documentation eliminates manual documentation errors and preserves a transparent and trustworthy record for later review. In this embodiment, the proximity of the two indicators makes it possible to capture a close-up photograph of both at one time. Successive close-up photographs of these two indicators at different locations within a flight of stairs clearly show the amount of variance in step dimensions and provide convincing documentation of code compliance.

FIG. 2A-2E

Figure 2A:
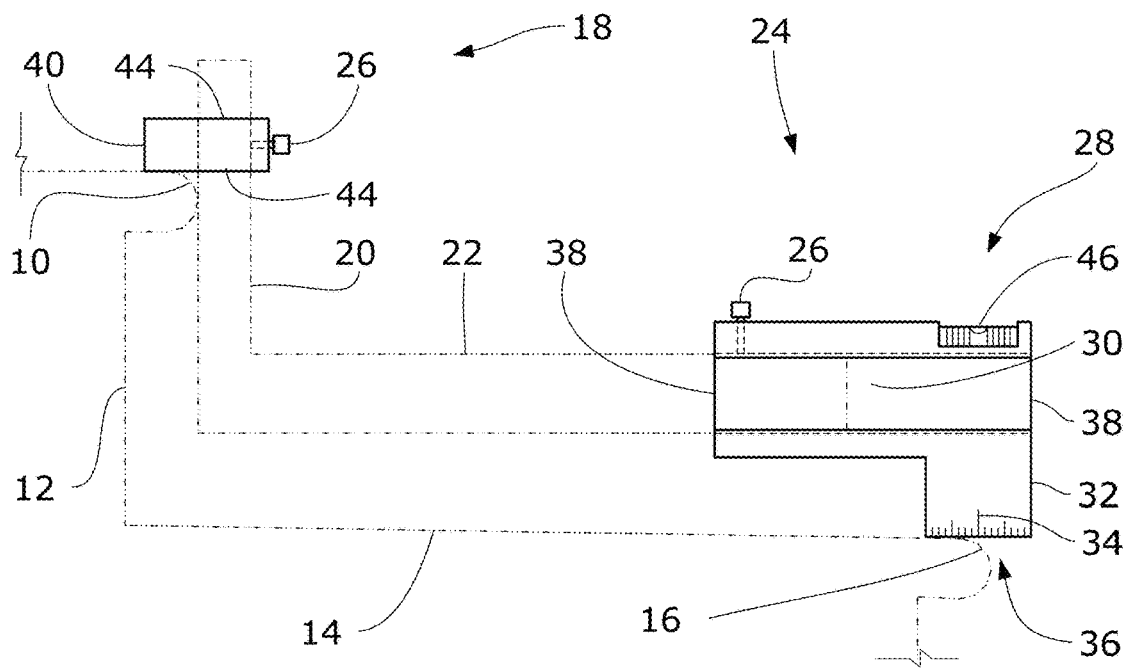
FIG. 2A is a left side view according to one embodiment shown attached to an 8 in.×12 in. (203.2 mm×304.8 mm) carpenter's square measuring a step with projecting rounded nosings and sloping treads with a riser height of 7¾ in. (196.9 mm) and tread depth of 15 in. (381 mm)
Figure 2B:
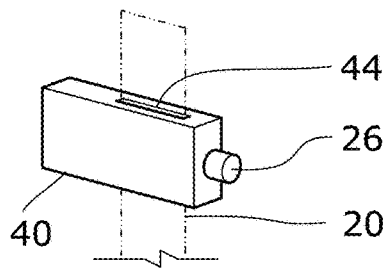
FIGS. 2B and 2C are partial left perspective and partial right perspective views of a vertical rule stop according to one embodiment.
Figure 2C:
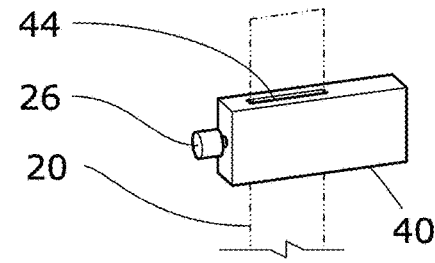
Figure 2D:
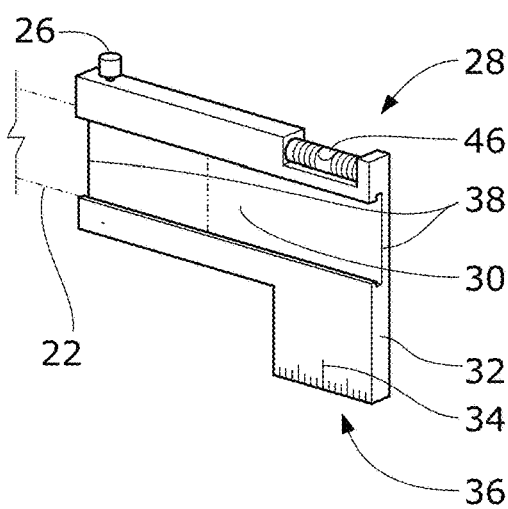
FIGS. 2E and 2D are partial left perspective and partial right perspective views of a horizontal rule stop according to one embodiment.
Figure 2E:
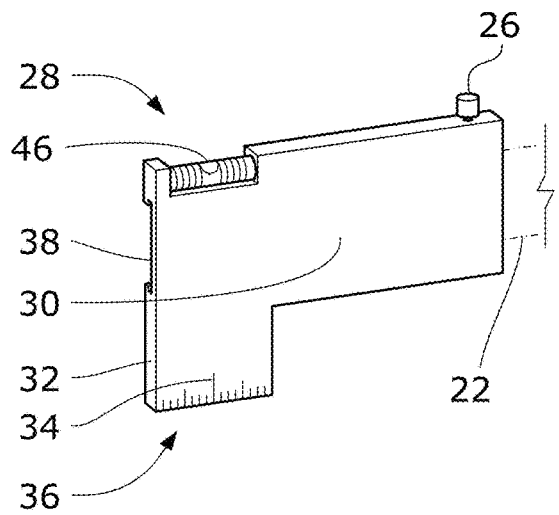

Another embodiment of the present invention is illustrated in FIG. 2A (left side view), FIG. 2B (partial left perspective view), FIG. 2C (partial right perspective view), FIG. 2D (partial left perspective view) and FIG. 2E (partial right perspective view). This embodiment includes a taller pivot spacer 32 and a longer horizontal extension 30 to enable measuring larger steps. The 7 in. (50.8 mm) length horizontal extension 30 of this embodiment allows evaluating tread depths up to approximately 16 in. (330 mm). The 3 in. (25.4 mm) height pivot spacer 32 of this embodiment allows evaluating riser heights up to approximately 10.5 in. (267 mm). The vertical slot 44 of this embodiment is fully enclosed. The vertical slot 44 can be either fully closed or partially open on one or more sides.

The operation of this embodiment is like that of FIG. 1A to 1E.

FIG. 3A-3E

Figure 3A:
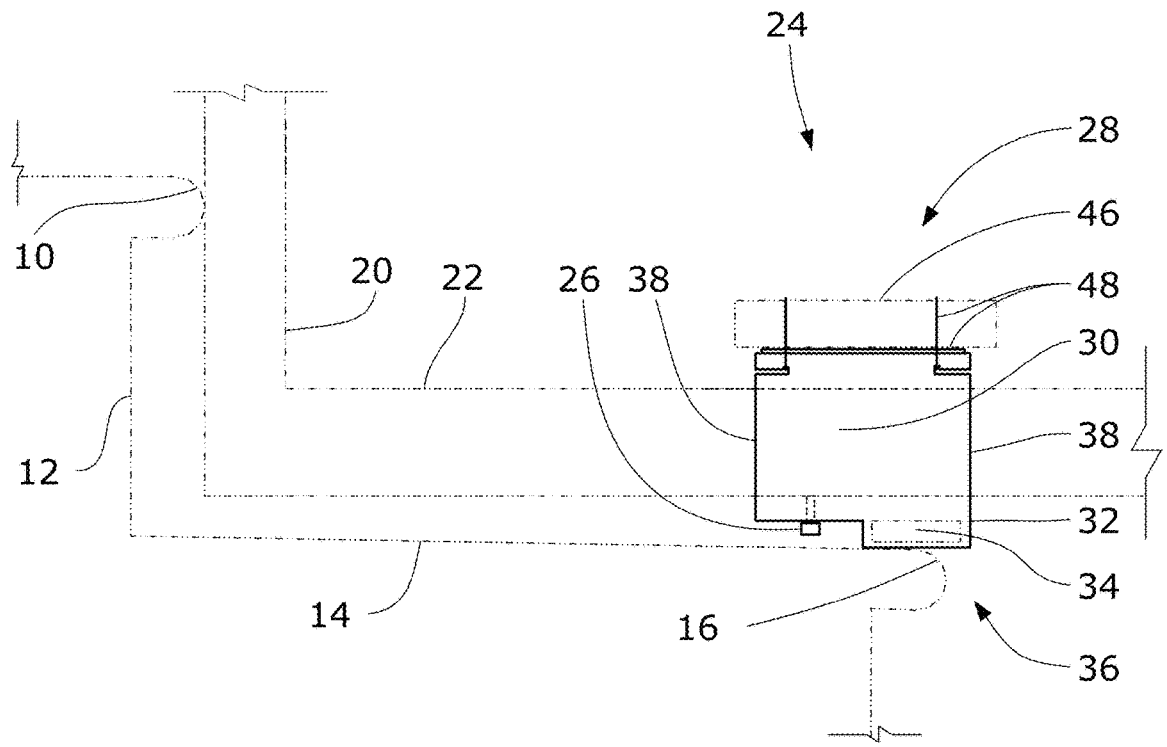
FIG. 3A is a left side view according to one embodiment shown attached to a 16 in.×24 in. (406.4 mm×605.6 mm) carpenter's square measuring a step with projected and rounded nosings and sloping treads with a riser height of 7¾ in. (196.9 mm) and tread depth of 14 in. (381 mm).
Figure 3B:
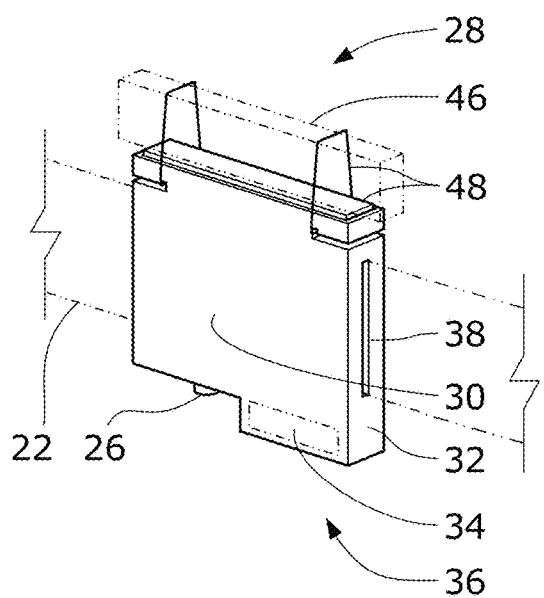
FIGS. 3B and 3C are partial left perspective and partial right perspective views of a horizontal rule stop according to one embodiment.
Figure 3C:
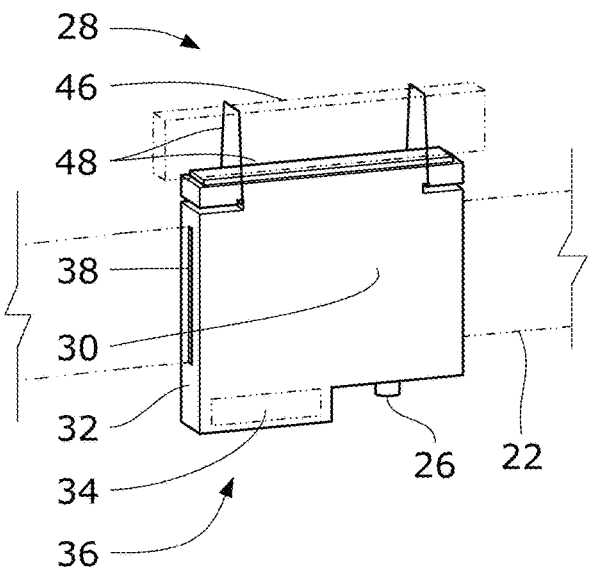

Another embodiment of the present invention is illustrated in FIG. 3A (left side view) FIG. 3B (left perspective view) & FIG. 3C (right perspective view).

The riser variance indicator 28 of this embodiment comprises a means of mounting 48 a means of determining slope 46 which is aligned substantially parallel to the longer square member 22 when attached. The means of determining slope 46 is represented in FIG. 3A to 3E as a torpedo level or digital level. The means of mounting 48 in this embodiment comprise a ferrous surface and elastic cords. The means of determining slope 46 can alternatively or further comprise one or more graduated spirit levels, spirit levels, inclinometers, or other types of digital sensors. The means of mounting can alternatively or further comprise a stable non-slippery surface, ferrous surface, hook and loop, elastic cords, rubber bands, and/or adhesive.

This embodiment is shown attached to a 16 in.×24 in. (406.4 mm×605.6 mm) carpenter's square. The horizontal slot 38 of this embodiment is sufficiently sized for a secure connection to the longer square member 22 which is approximately 2 in. (25.4 mm)×⅛ in. (3.2 mm).

The horizontal slot 38 of this embodiment is fully enclosed on 4 sides. The horizontal slot 38 can be either fully closed or partially open on one or more sides.

The tread variance indicator 36 in this embodiment does not comprise indicia and is represented with a sticker attached. When used without a sticker, the tread variance indicator 36 in this embodiment provides a fixed frame of reference for determining where the greatest variation in tread lengths occurs.

In operating this embodiment, one first mounts the means of determining slope 46 to the horizontal rule stop 24 via the means of mounting 48. Then one fixes the position of the horizontal rule stop 24 at a location along the length of the longer square member 22 where the center point of the tread variance indicator 36 is positioned approximately at the required tread depth.

Next, one places the horizontal rule stop 24 on a lower nosing 16 of a step, while orienting the longer square member 22 approximately perpendicular to the lower nosing 16. The shorter square member 20 is oriented approximately vertically against the leading edge of the upper nosing 10 and positioned where the required riser height indicated on the shorter square member is even with the top surface of the upper nosing 10. The apparatus is now ready to be read and variances documented.

The required riser height is met when the riser variance indicator 28 indicates zero slope. Any variance from a reading of zero slope is directly displayed and can be easily seen and recorded. The required tread depth is met when the leading edge of the lower nosing 16 aligns with the center point of the tread variance indicator 36. Any variance between this center point and the actual position of the leading edge of the lower nosing 16 can be easily seen and recorded.

Once variances are recorded, the apparatus may be moved to a new location on the stair. The horizontal rule stop 24 does not require additional adjustments for subsequent measurements.

FIG. 4A-4C

Figure 4A:
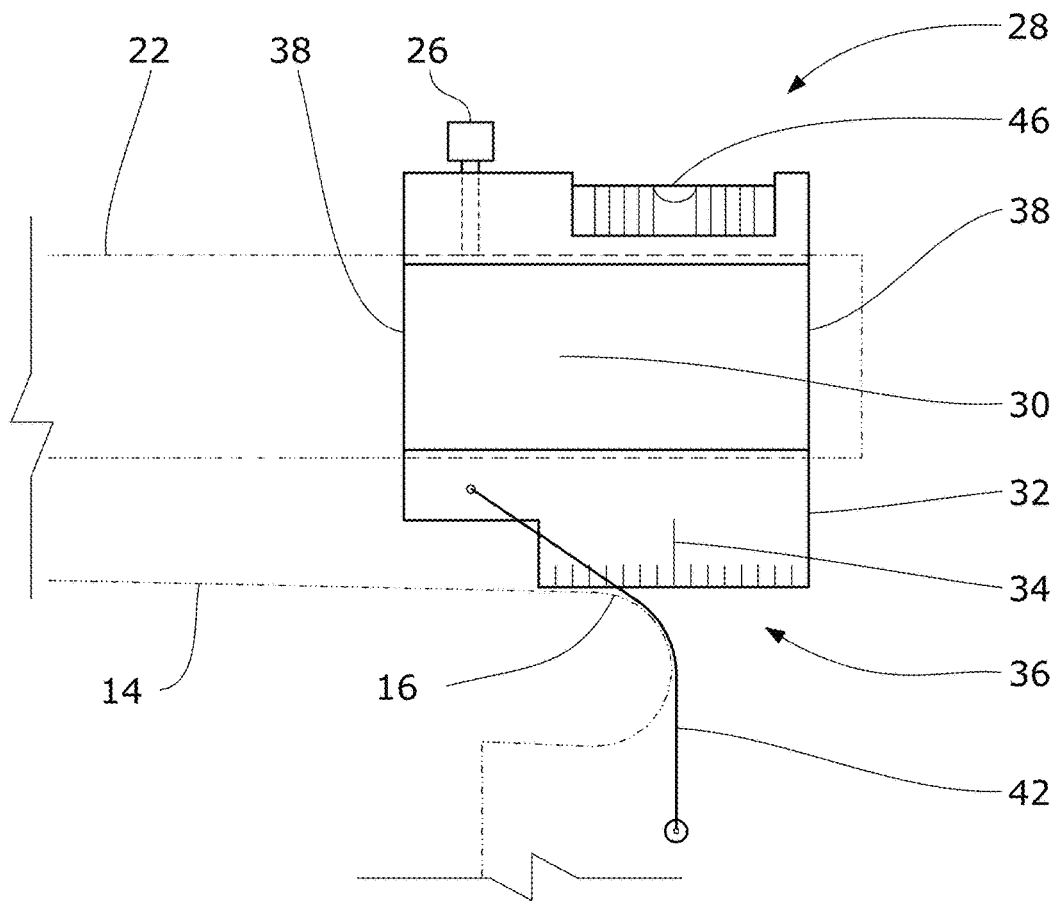
FIG. 4A to 4C are partial left-side, partial left perspective, and partial right perspective views of a horizontal rule stop according to one embodiment.
Figure 4B:
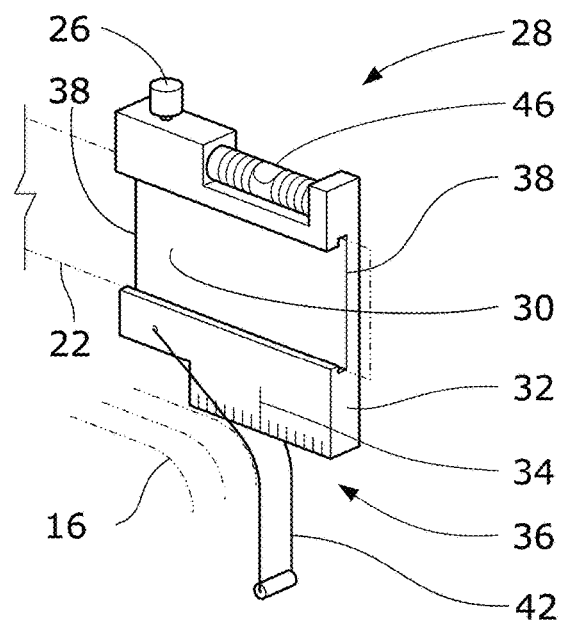
Figure 4C:
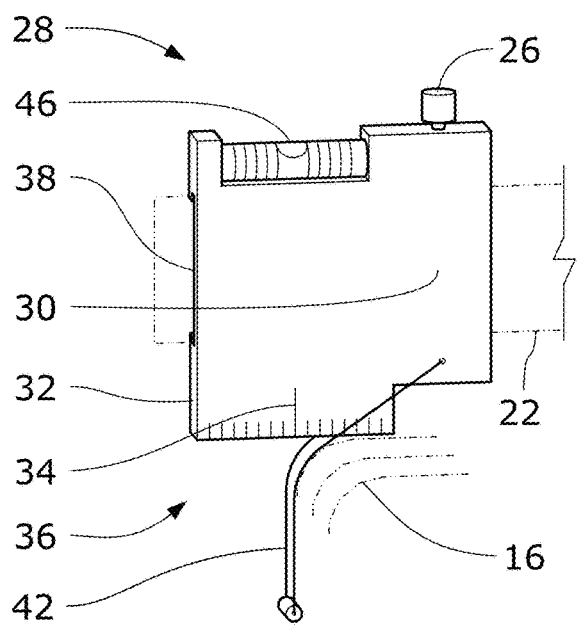

Another embodiment of the present invention is illustrated in FIG. 4A (left side view), FIG. 4B (left perspective view), and FIG. 4C (right perspective view). The horizontal rule stop 24 of this embodiment further comprises a stable nosing locator 42 comprising a flexible linear member, such as a string, rope, wire, or similar approximately 30 gauge (0.3 mm) to 20 gauge (1.0 mm) thick with a weight connected to one end. The second end of the stable nosing locator 42 is rotatably attached to the horizontal rule stop 24 at a predetermined position relative to the riser variance indicator 28. The length of the stable nosing locator 42 is preferably 4 in. (102 mm) to 10 in. (254 mm) and extends at least approximately 1 in. (25.4 mm) past the end of the horizontal rule stop 24.

The first steps of operating this embodiment are like that of FIG. 1A to 1E. After the apparatus is in position resting on an upper and lower nosing, the stable nosing locator 42 is hung over the edge of a lower nosing 16 and released. The weight rotates the stable nosing locator 42 down so that it touches the lower nosing 16 and is pulled taught. The point where the stable nosing locator 42 touches the upper portion of the lower nosing 16 is the extent of the tread depth which can be documented via the adjacent tread variance indicator 36.

The required tread depth is met when the stable nosing locator 42 touches the upper portion of the lower nosing 16 at the center point of the tread variance indicator 36. The nosing represented in FIG. 4A is rounded and the stable nosing locator 42 indicates the tread depth is less than required when excluding unstable portions of the nosing. The required riser height is met when the riser variance indicator 28 indicates zero slope. The riser variance indicator 28 is represented in FIG. 4A measuring a riser height equal to the required riser height.

FIG. 5A-5C

Figure 5A:
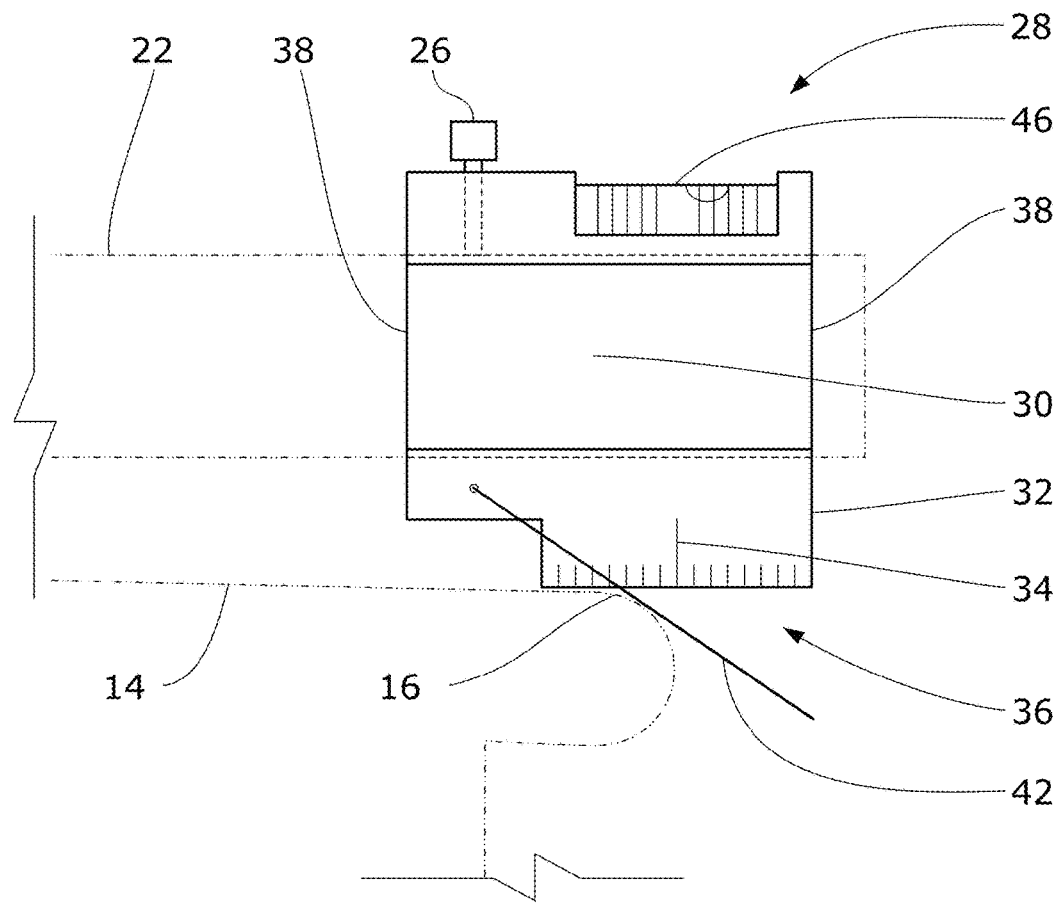
FIG. 5A to 5C are partial left-side, partial left perspective, and partial right perspective views of a horizontal rule stop according to one embodiment.
Figure 5B:
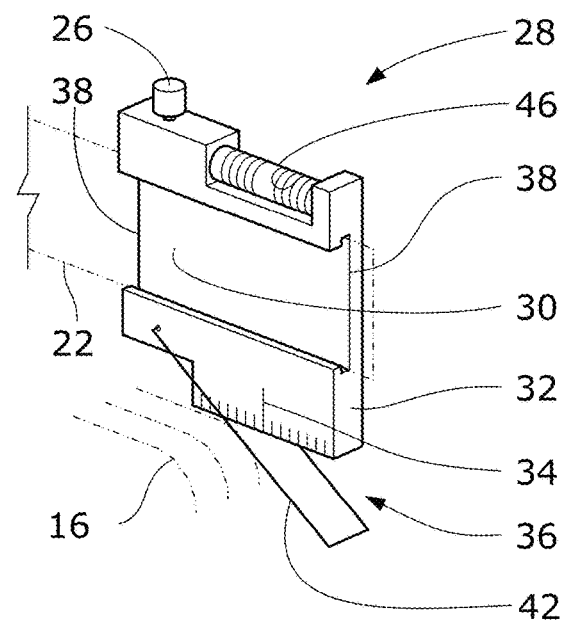
Figure 5C:
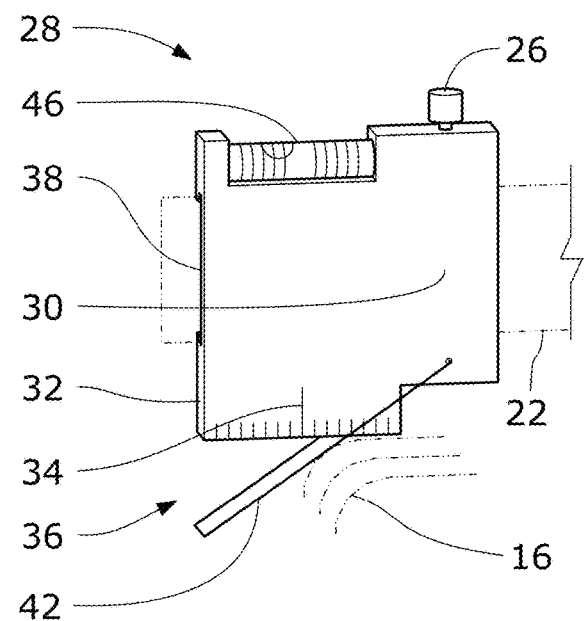

Another embodiment of the present invention is illustrated in FIG. 5A (left side view) FIG. 5B (left perspective view) & FIG. 5C (right perspective view). The horizontal rule stop 24 of this embodiment further comprises a stable nosing locator 42. The stable nosing locator 42 in this embodiment comprises a rigid linear member approximately 20 gauge (1 mm) to 10 gauge (3 mm) thick. The stable nosing locator 42 is rotatably attached on a first end to the horizontal rule stop 24 at a predetermined position relative to the riser variance indicator 28. The length of the stable nosing locator 42 is preferably 4 in. (102 mm) to 10 in. (254 mm) and extends at least approximately 1 in. (25.4 mm) past the end of the horizontal rule stop 24.

The first steps of operating this embodiment are like that of FIG. 1A to 1E. After the apparatus is in position resting on an upper and lower nosing, the linear member is rotated until it touches the lower nosing 16. The point where the stable nosing locator 42 touches the upper portion of the lower nosing 16 is the extent of the tread depth which can be documented via the adjacent tread variance indicator 36.

The required tread depth is met when the stable nosing locator 42 touches the upper portion of the lower nosing 16 at the center point of the tread variance indicator 36. The nosing represented in FIG. 5A is rounded and the stable nosing locator 42 indicates the tread depth is less than required when excluding unstable portions of the nosing. The required riser height is met when the riser variance indicator 28 indicates zero slope. The riser variance indicator 28 is represented in FIG. 5A measuring a riser taller than required and displaying the amount of variance from the required riser height.

FIG. 6A-6C

Figure 6A:
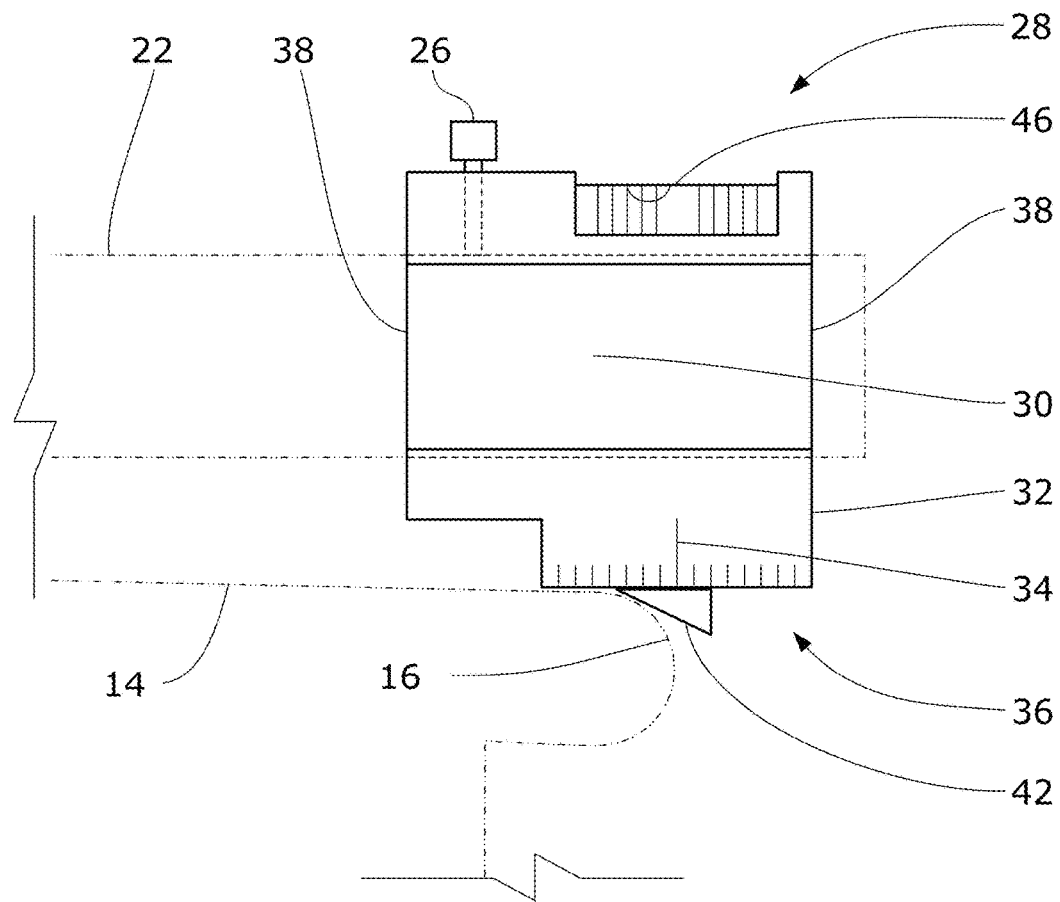
FIG. 6A to 6C are partial left-side, partial left perspective, and partial right perspective views of a horizontal rule stop according to one embodiment.
Figure 6B:
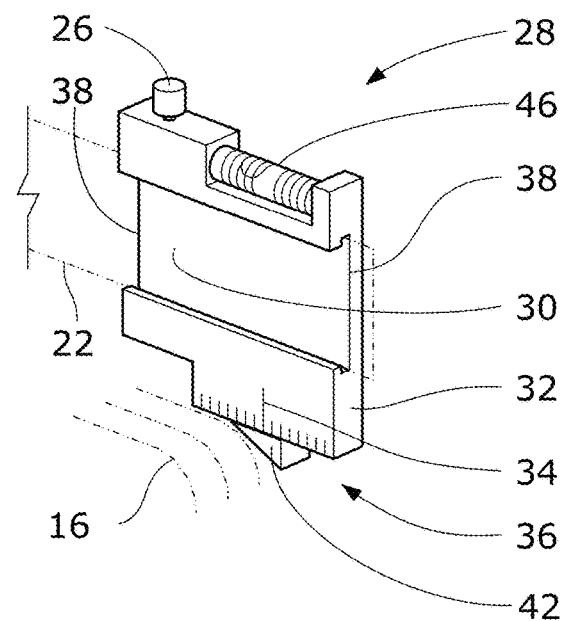
Figure 6C:
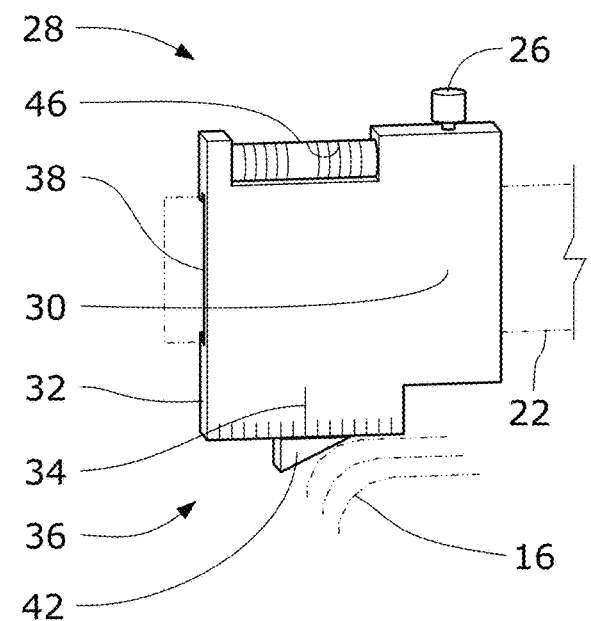

Another embodiment of the present invention is illustrated in FIG. 6A (side view) FIG. 6B (left perspective view) & FIG. 6C (right perspective view). The horizontal rule stop 24 of this embodiment further comprises a stable nosing locator 42 comprising finger attachable along the length of the bottom surface of the horizontal rule stop 24. In this embodiment, said finger is triangular with a predetermined angle corresponding to the threshold for rounded or beveled nosings. The height of the stable nosing locator 42 measured in an approximately perpendicular direction to the bottom of the horizontal rule stop 24 is approximately ½ in. (12.7 mm). The length is approximately 1¼ in (31.75 mm). The stable nosing locator 42 in this embodiment can alternatively comprise a rectangular-shaped finger. The stable nosing locator 42 is preferred to be at least ½ in. (12.7 mm) in height, at least ½ in (12.7 mm) in length, and any thickness that provides sufficient structural strength and/or surface area for attaching.

The first steps of operating this embodiment are like that of FIG. 1A to 1E. After the apparatus is in position resting on an upper and lower nosing, the operator positions the stable nosing locator 42 along the bottom surface of the horizontal rule stop 24 so that the angled surface of the stable nosing locator 42 touches the upper portion of the lower nosing 16. The point where the stable nosing locator 42 touches the nosing is the extent of the tread depth. This tread depth can then be documented via the adjacent tread variance indicator 36.

The required tread depth is met when the stable nosing locator 42 touches the upper portion of the lower nosing 16 at the center point of the tread variance indicator 36. The nosing represented in FIG. 6A is rounded and the stable nosing locator 42 indicates the tread depth is less than required when excluding unstable portions of the rounded nosing. The required riser height is met when the riser variance indicator 28 indicates zero slope. The riser variance indicator 28 is represented in FIG. 6A measuring a riser shorter than required and displaying the amount of variance from the required riser height.

ADVANTAGES

From the description above, many advantages of some embodiments of the present invention become evident:

Some embodiments provide a pivot spacer which enables the present invention to be supported on a lower nosing and pivoted into a position determined by the riser height rather than supported directly on a tread and positioned relative to the tread slope. The pivot spacer also enables a compact square to measure riser heights greater than the length of its shorter square member.

Some embodiments provide tread and riser variance indicators which:
 a. remove the need to record absolute dimensions for each measurement and then perform math to determine variances,
 b. remove the need to perform leveling for each location to be measured,
 c. provide direct measurements of riser height or tread depth variances which can be documented photographically,
 d. replace hard-to-read stamped indicia on commonly available carpenter's squares,
 e. replace inconsistent indicia on the back side of some carpenter's squares with consistent indicia enabling consistent documentation from both sides of the present invention while in place on a step.

Some embodiments provide tread variance indicators that establish a fixed frame of reference for successive tread depth measurements thereby facilitating effective photographic or manual documentation.

Some embodiments provide riser variance indicators which are located near the lower nosing and tread variance indicator. This position enables capturing both tread depth and riser height variance measurements in a single closeup photo.

Some embodiments provide riser variance indicators which remove the need to adjust or level the present invention at each location to be measured, thereby increasing speed and precision.

Some embodiments provide a pivot hanger that enables supporting one end of the present invention via an upper nosing above rather than resting on the tread below. The resulting distribution of weight provides increased balance and enables the present invention to be self-standing.

Some embodiments provide horizontal extensions which enable a compact square to measure the most common tread lengths, including those greater than the compact square's longer member.

Some embodiments enable accurate evaluation of riser heights when a tread surface is sloped, and of tread depths when a tread nosing is rounded or beveled.

Some embodiments provide a stable nosing locator which excludes unstable portions of nosings from tread depth measurements.

Some embodiments provide a flexible stable nosing locator which enables photographic documentation of nosing profile shape.

Some embodiments can be made to be collapsible to the size of a book, yet capable of measuring a tread depth up to approximately 16 in. (406 mm) and a riser height up to approximately 10 in. (254 mm).

Some embodiments are self-contained, and do not require combining separate tools, or electricity.

Some embodiments are self-standing which enables one person to operate and perform subsequent measurements or photography.

Some embodiments enable minimally trained operators to verify code compliance or collect trustworthy photographic evidence for others to later interpret.

Some embodiments are attached to a low-cost and commonly available carpenter's square, reducing the overall cost to produce and ship the present invention. Said tool is also widely known and its properties and level of accuracy are well established.

I claim:

1. An apparatus for documenting dimensional uniformity in a constructed stair comprising:
 a horizontal rule stop comprising:
  a horizontal slot,
  a means of fixing position,
  a riser variance indicator comprising at least one means of determining slope,
  a pivot spacer,
  at least one tread variance indicator,
 wherein:
  the horizontal slot is sufficiently sized for a secure connection to a longer square member,
  the means of determining slope comprises a graduated spirit level, spirit level, inclinometer, digital level, and/or other type of digital sensor,
  the pivot spacer is preferably ¼ in. (6.4 mm) to 4 in. (102 mm) tall, more preferably 1 in. (25.4 mm) to 3 in. tall, and most preferably 1 in. (25.4 mm) or 2 in. (50.8 mm) tall,
 whereby:
  upon fixing the horizontal rule stop along the length of the longer square member at a position relative to the required tread depth, the means of determining slope is aligned substantially parallel to the longer square member,
  upon placing the horizontal rule stop on a lower nosing and the shorter square member against an upper nosing in a substantially vertical orientation and at a height determined by the required and measured riser height, any variations between the required and actual step dimensions are displayed via the riser variance indicator and tread variance indicators.

2. The apparatus of claim 1 further comprising a stable nosing locator,
 wherein:
  the stable nosing locator comprises a finger slidably attachable to the bottom of the horizontal rule stop,
  the finger projects from the bottom surface of the horizontal rule stop or at least ¼ in. (6.4 mm),
 whereby:
  upon sliding the finger against the leading edge of a lower nosing the position of the finger can be read along the length of the tread variance indicator.

3. The apparatus of claim 1 further comprising a stable nosing locator,
wherein:
the stable nosing locator comprises a linear member rotatably attached on one end to the horizontal rule stop at a position relative to the tread variance indicator,
the opposite end of the linear member extends past a lower nosing,
whereby the stable nosing locator can be rotated until it touches an upper surface of a lower nosing at a point indicating the extent of a tread depth which can be documented via the adjacent tread variance indicator.

4. The apparatus of claim 1 wherein one or more tread variance indicators comprise indicia.

5. The apparatus of claim 1, wherein the horizontal rule stop further comprises a horizontal extension.

6. The apparatus of claim 1, further comprising a vertical rule stop comprising a vertical slot, a pivot hanger, and means of fixing position.

7. The apparatus of claim 1, further comprising a vertical rule stop comprising a vertical slot, a pivot hanger, and means of fixing position.

8. The apparatus of claim 1, further comprising a vertical rule stop comprising a vertical slot, a pivot hanger, and means of fixing position.

9. The apparatus of claim 1, further comprising a vertical rule stop comprising a vertical slot, a pivot hanger, and means of fixing position.

10. The apparatus of claim 1, further comprising a vertical rule stop comprising a vertical slot, a pivot hanger, and means of fixing position.

11. An apparatus for documenting dimensional uniformity in a constructed stair comprising:
a horizontal rule stop comprising:
a horizontal slot,
a means of fixing position,
a riser variance indicator comprising:
a means of mounting,
a means of determining slope,
a pivot spacer,
at least one tread variance indicator,
wherein:
the horizontal slot is sufficiently sized for a secure connection to a longer square member,
the means of determining slope comprises a graduated spirit level, spirit level, inclinometer, digital level, or other type of digital sensor,
the means of mounting consists of one or more of one or more of a flat non-slippery or ferrous top surface, hook and loop, elastic cords, rubber bands, or adhesive,
the pivot spacer is preferably ¼ in. (6.4 mm) to 4 in. (102 mm) tall, more preferably 1 in. (25.4 mm) to 3 in. tall, and most preferably 1 in. (25.4 mm) or 2 in. (50.8 mm) tall,
whereby:
upon fixing the horizontal rule stop along the length of a longer square member at a position relative to the required tread depth, the means of determining slope is aligned substantially parallel to the longer square member,
upon placing the horizontal rule stop on a lower nosing and the shorter square member against an upper nosing in a substantially vertical orientation and at a height determined by the required riser height any variations between the required and actual step dimensions are displayed via the riser variance indicator and tread variance indicator.

12. The apparatus of claim 1 further comprising a stable nosing locator,
wherein:
the stable nosing locator comprises a finger slidably attachable to the bottom of the pivot spacer,
the finger projects from the bottom surface of the pivot spacer at least ¼ in. (6.4 mm),
the finger is removable,
whereby:
upon sliding the finger against the leading edge of a lower nosing the position of the finger can be read along the length of the tread variance indicator.

13. The apparatus of claim 1 further comprising a stable nosing locator,
wherein:
the stable nosing locator comprises a linear member rotatably attached on one end to the horizontal rule stop at a position relative to the tread variance indicator,
the opposite end of the linear member extends past a lower nosing,
whereby the stable nosing locator can be rotated until it touches an upper surface of a lower nosing at a point indicating the extent of a tread depth which can be documented via the adjacent tread variance indicator.

14. The apparatus of claim 11 wherein one or more tread variance indicators comprise indicia.

15. The apparatus of claim 11, wherein the horizontal rule stop further comprises a horizontal extension.

16. The apparatus of claim 11, further comprising a vertical rule stop comprising a vertical slot, a pivot hanger, and means of fixing position.

17. The apparatus of claim 11, further comprising a vertical rule stop comprising a vertical slot, a pivot hanger, and means of fixing position.

18. The apparatus of claim 11, further comprising a vertical rule stop comprising a vertical slot, a pivot hanger, and means of fixing position.

19. The apparatus of claim 11, further comprising a vertical rule stop comprising a vertical slot, a pivot hanger, and means of fixing position.

20. The apparatus of claim 11, further comprising a vertical rule stop comprising a vertical slot, a pivot hanger, and means of fixing position.

* * * * *